US007240022B1

(12) United States Patent
Bistriceanu et al.

(10) Patent No.: US 7,240,022 B1
(45) Date of Patent: Jul. 3, 2007

(54) DEMOGRAPHIC INFORMATION GATHERING AND INCENTIVE AWARD SYSTEM AND METHOD

(75) Inventors: Virgil Bistriceanu, Chicago, IL (US); Craig Muller, Rolling Meadows, IL (US)

(73) Assignee: MyPoints.com Inc., San Francisco, CA (US)

( * ) Notice: Subject to any disclaimer, the term of this patent is extended or adjusted under 35 U.S.C. 154(b) by 941 days.

(21) Appl. No.: 09/080,946

(22) Filed: May 19, 1998

(51) Int. Cl.
    *G06Q 30/00* (2006.01)
(52) U.S. Cl. ....................................... 705/14
(58) Field of Classification Search .................. 705/14, 705/1, 10, 26, 27; 709/203, 218
    See application file for complete search history.

(56) References Cited

U.S. PATENT DOCUMENTS

| 3,639,686 | A | 2/1972 | Walker et al. | 178/5.8 R |
|---|---|---|---|---|
| 3,769,579 | A | 10/1973 | Harney | 325/31 |
| 4,331,973 | A | 5/1982 | Eskin et al. | 358/84 |
| 4,546,382 | A | 10/1985 | McKenna et al. | 358/84 |
| 4,602,279 | A | 7/1986 | Freeman | 358/86 |
| 4,630,108 | A | 12/1986 | Gomersall | 358/84 |
| 4,646,145 | A | 2/1987 | Percy et al. | 358/84 |
| 4,658,290 | A | 4/1987 | McKenna et al. | 358/84 |
| 4,745,468 | A | 5/1988 | Von Kohorn | 358/84 |
| 4,791,281 | A | 12/1988 | Johnsen et al. | 235/383 |
| 4,799,156 | A | 1/1989 | Shavit et al. | 364/401 |
| 4,805,020 | A | 2/1989 | Greenberg | 358/147 |
| 4,850,007 | A | 7/1989 | Marino et al. | 379/67 |

(Continued)

FOREIGN PATENT DOCUMENTS

EP          0 265 232 A2      4/1988

(Continued)

OTHER PUBLICATIONS

Oberndorf, Shannon, "Points for Loyalty," Catalog Age, vol. 14, No. 13, pp. 35, 38, Dec. 1997.*

(Continued)

*Primary Examiner*—Susanna M. Diaz
(74) *Attorney, Agent, or Firm*—Marshall, Gerstein & Borun LLP

(57) ABSTRACT

A system and method provides web site proprietors with demographics information about the users who visit their web sites, and provides web site visitors with incentive awards (i.e., points) in exchange for providing the demographics information and interacting with the web sites in a predefined manner. Users complete a questionnaire designed to solicit various demographics data of interest to web site proprietors. A profile is then associated with user identification information and stored on a server. The identification information is also stored on the user's local device to identify the user on subsequent visits to participating sites. Users visit the web sites of one or more participating web site proprietors. In so doing the participating user will be awarded points that can be redeemed for products or services at a later date. The system automatically awards points to deserving users without requiring the users to manually leave the web site awarding the points. Periodically, the system develops a report for each participating web site proprietor providing a demographics profile of the participating users that interacted with the web site in predefined ways. The system also provides redemption sites where participating users can visit to convert the points accumulated into products or services.

41 Claims, 7 Drawing Sheets

U.S. PATENT DOCUMENTS

| | | | |
|---|---|---|---|
| 4,872,113 A | 10/1989 | Dinerstein | 364/401 |
| 4,876,592 A | 10/1989 | Von Kohorn | 358/84 |
| 4,882,675 A | 11/1989 | Nichtberger et al. | 364/401 |
| 4,926,255 A | 5/1990 | Von Kohorn | 358/84 |
| 4,941,090 A | 7/1990 | McCarthy | 364/405 |
| 4,967,273 A | 10/1990 | Greenberg | 358/142 |
| 4,970,681 A | 11/1990 | Bennett | 364/900 |
| 4,972,504 A | 11/1990 | Daniel, Jr. et al. | 455/2 |
| 4,982,346 A | 1/1991 | Girouard et al. | 364/550 |
| 4,992,940 A | 2/1991 | Dworkin | 364/401 |
| 5,025,372 A | 6/1991 | Burton et al. | 364/406 |
| 5,034,807 A | 7/1991 | Von Kohorn | 358/84 |
| 5,056,019 A | 10/1991 | Schultz et al. | 364/405 |
| 5,057,915 A | 10/1991 | Von Kohorn | 358/84 |
| 5,114,128 A | 5/1992 | Harris, Jr et al. | 270/11 |
| 5,117,355 A | 5/1992 | McCarthy | 364/405 |
| 5,128,752 A | 7/1992 | Von Kohorn | 358/84 |
| 5,155,591 A | 10/1992 | Wachob | 358/86 |
| 5,191,410 A | 3/1993 | McCalley et al. | 358/86 |
| 5,201,010 A | 4/1993 | Deaton et al. | 382/7 |
| 5,202,826 A | 4/1993 | McCarthy | 364/405 |
| 5,220,501 A | 6/1993 | Lawlor et al. | 364/408 |
| 5,227,874 A | 7/1993 | Von Kohorn | 358/84 |
| 5,283,731 A | 2/1994 | Lalonde et al. | 364/401 |
| 5,283,734 A | 2/1994 | Von Kohorn | 364/412 |
| 5,287,181 A | 2/1994 | Holman | 348/473 |
| 5,287,268 A | 2/1994 | McCarthy | 364/405 |
| 5,305,195 A | 4/1994 | Murphy | 364/401 |
| 5,347,632 A | 9/1994 | Filepp et al. | 395/200 |
| 5,369,571 A | 11/1994 | Metts | 364/401 |
| RE34,915 E | 4/1995 | Nichtberger et al. | 364/401 |
| 5,410,598 A | 4/1995 | Shear | 380/4 |
| 5,438,355 A | 8/1995 | Palmer | 348/1 |
| 5,438,356 A | 8/1995 | Ushiki et al. | 348/12 |
| 5,446,919 A | 8/1995 | Wilkins | 455/6.2 |
| 5,467,269 A | 11/1995 | Flaten | 364/401 |
| 5,483,444 A | 1/1996 | Heintzeman et al. | 364/401 |
| 5,500,681 A | 3/1996 | Jones | 348/473 |
| 5,502,636 A | 3/1996 | Clarke | 364/401 |
| 5,515,098 A | 5/1996 | Carles | 348/8 |
| 5,537,314 A | 7/1996 | Kanter | 364/406 |
| 5,557,721 A | 9/1996 | Fite et al. | 395/148 |
| 5,621,812 A | 4/1997 | Deaton et al. | 382/100 |
| 5,664,115 A | 9/1997 | Fraser | 705/37 |
| 5,675,510 A * | 10/1997 | Coffey et al. | 364/514 A |
| 5,708,780 A | 1/1998 | Levergood et al. | |
| 5,710,884 A * | 1/1998 | Dedrick | 395/200.47 |
| 5,712,979 A * | 1/1998 | Graber et al. | 395/200.11 |
| 5,717,860 A * | 2/1998 | Graber et al. | 395/200.12 |
| 5,717,923 A * | 2/1998 | Dedrick | 395/613 |
| 5,734,838 A | 3/1998 | Robinson et al. | 395/214 |
| 5,740,252 A * | 4/1998 | Minor et al. | 713/153 |
| 5,751,956 A * | 5/1998 | Kirsch | 395/200.33 |
| 5,751,961 A | 5/1998 | Smyk | |
| 5,774,870 A * | 6/1998 | Storey | 705/14 |
| 5,794,210 A * | 8/1998 | Goldhaber et al. | 705/14 |
| 5,812,769 A * | 9/1998 | Graber et al. | 395/200.12 |
| 5,835,087 A * | 11/1998 | Herz et al. | 345/810 |
| 5,848,396 A * | 12/1998 | Gerace | 705/10 |
| 5,855,008 A * | 12/1998 | Goldhaber et al. | 705/14 |
| 5,915,243 A * | 6/1999 | Smolen | 705/14 |
| 5,923,016 A * | 7/1999 | Fredregill et al. | 235/380 |
| 5,931,907 A * | 8/1999 | Davies et al. | 709/218 |
| 5,937,391 A * | 8/1999 | Ikeda et al. | 705/14 |
| 5,960,409 A * | 9/1999 | Wexler | 705/14 |
| 5,974,398 A * | 10/1999 | Hanson et al. | 705/14 |
| 5,991,735 A * | 11/1999 | Gerace | 705/10 |
| 5,991,736 A * | 11/1999 | Ferguson et al. | 705/14 |
| 5,999,914 A * | 12/1999 | Blinn et al. | 705/26 |
| 6,016,504 A * | 1/2000 | Arnold et al. | 709/200 |
| 6,029,141 A * | 2/2000 | Bezos et al. | 705/27 |
| 6,049,785 A * | 4/2000 | Gifford | 705/39 |
| 6,138,142 A * | 10/2000 | Linsk | 709/203 |
| 6,286,005 B1 * | 9/2001 | Cannon | 707/100 |
| 6,915,271 B1 * | 7/2005 | Meyer et al. | 705/14 |
| 2003/0139969 A1 * | 7/2003 | Scroggie et al. | 705/26 |

FOREIGN PATENT DOCUMENTS

| | | |
|---|---|---|
| EP | 0 308 224 A2 | 3/1989 |
| GB | 1565286 | 4/1978 |
| JP | 53013830 A | 2/1978 |
| JP | 63037726 A | 2/1988 |
| JP | 63037727 A | 2/1988 |
| JP | 05217073 A | 8/1993 |
| JP | 05298337 | 11/1993 |
| JP | 06004771 | 1/1994 |
| JP | 06276376 | 9/1994 |
| JP | 07230494 | 8/1995 |
| WO | WO 93/12489 | 6/1993 |
| WO | WO 95/16971 | 6/1995 |
| WO | WO 96/39668 | 12/1996 |
| WO | WO 97/22058 | 6/1997 |
| WO | WO 97/22074 | 6/1997 |
| WO | WO 97/23838 | 7/1997 |
| WO | WO 98/05011 | 2/1998 |
| WO | WO98/31155 | 7/1998 |

OTHER PUBLICATIONS

"Web Becomes a Viable Channel," Advertising Age, p. 21, Dec. 1997.*

"In Brief: Web Revenues Up Ahead: Less Hat, More Cattle," Media Daily, vol. 4, No. 5, p. N/A, Dec. 1997.*

MotivationNet, Inc., "Universal Rewards Currency Introduced at Internet World Show," PR Newswire, Dec. 1997.*

"Green Stamps Hit the Web in E-Mail Incentive Programs," Advertising Age, p. s24, Nov. 1997.*

"Open Market and Pilot Partner for Secure Electronic Commerce," PR Newswire, p. 1104SFTUO26, Nov. 1997.*

Magill, Ken, "Direct Tech Backs MyPoints' Online Targeting Program," DM News, vol. 19, No. 39, p. 19, Oct. 1997.*

Wagner, Mitch, "Frequent-Surfer Programs Help Pull in the Hits," ComputerWorld, vol. 31, No. 40, pp. 45-46, Oct. 1997.*

"Green Stamps Go Cyber," Promo, p. 13, Oct. 1997.*

"Web Incentive Program Wins Clout With Airline Alliance," Advertising Age, vol. 68, No. 39, p. 43, Sep. 1997.*

"MotivationNet Benefits from Flexibility of Open Market's Award-Winning Internet Commerce Software," PR Newswire, p. 0902NEMTU01, Sep. 1997.*

Riedman, Patricia, "MyPoints Aims to Be Universal Web Currency," Advertising Age, vol. 68, p. 17, Aug. 1997.*

"MyPoints.com Online Media Kit" [Retrieved on Feb. 16, 2000] Internet: <URL: http://www.mypointsinc.com/content/body/b11120.htm>, Feb. 2000.*

"Intellipost Launches Bonusmail with 50,000 Members," Dated Jun. 30, 1997 [Retrieved on Jul. 23, 1999] Internet: <http://www.mypointsinc.com/content/body/releases/press001.htm>, Jun. 1997.*

"Our People <Management" [Retrieved on Feb. 16, 2000] Internet: <URL: http://www.mypointsinc.com/content/body/b24310.htm>, Feb. 2000.*

"Direct marketing Solutions to Increase Your ROI" [Retrieved on Feb. 16, 2000] Internet: <URL: http://www.mypointsinc.com/content/body/b11423.htm>, Feb. 2000.*

"All About Earning With MyPoints" [Retrieved on Feb. 16, 2000] Internet: <URL: http://www.mypoints.com/mp/dStatial.show?isref=main.sampleWeb EarningOpps.default, Feb. 2000.*

"MyPoints Member Guide" [Retrieved on Feb. 16, 2000] Internet: <URL: http://www.mypoints.com/mp/dStatial.show?isref=main.nonmemberguide.default>, Feb. 2000.*

"MyPoints Privacy Promise" [Retrieved on Feb. 16, 2000] Internet: <URL: http://www.mypoints.com/mp/dStatial.show?isref=main.privacyPolicy.default>, Feb. 2000.*

"My Points: Help: Useful Information" [Retrieved on Feb. 16, 2000] Internet: <URL: http://www.mypoints.com/mp/dStatial.show?isref=main.nonmemberhelp.default>, Feb. 2000.*

"Let the Internet Reward You: Join MyPoints Today" [Retrieved on Jul. 23. 1999] Internet: <URL: http://www.mypoints.com/>, Jul. 1999.*

"Welcome to MyPoints: Get a $10 Gift Certificate" [Retrieved on Feb. 16, 2000] Internet: <URL: http://www.mypoints.com/?MCK=3f47e40438ab16a4>, Feb. 2000.*

"MyPoints.com Unveils Integrated Approach to Internet Direct Marketing," Dated Apr. 21, 1999 [Retrieved on Jul. 23, 1999] Internet: URL: http://www.mypointsinc.com/content/body/releases/press024.htm>, Apr. 1999.*

"Primedia Ventures Invests in Intellipost," Dated Jan. 8, 1999 [Retrieved on Jul. 23, 1999] Internet: <URL: http://www.mypointsinc.com/content/body/releases/press017.htm>, Jan. 1999.*

"Net Perceptions Takes on Firefly with Profiling System," Advertising Age, vol. 68, No. 29, p. 27, Jul. 1997.*

Stevens, W. Richard. TCP/IP Illustrated, vol. 1. Addison Wesley Longman, Inc. pp. 231-234, 1994.*

Media Matrix—Frequently Asked Questions Article [Retrieved Mar. 4, 1998] Internet <URL: http://www.mediametrix.com,interact-mmfaq.htm>.

Media Matrix—Audience Measurement Services Article [Retrieved Mar. 4, 1998] Internet: <URL: http://www.mediametrix.com/interact-mmaudimeas.htm>.

Green, Heather, "The New Ratings Game", Business Week, Apr. 27, 1998, pp. 73-78.

Green, Heather, "Who Says the Young Have More Cyber Fun?", Business Week, Mar. 9, 1998, p. 92C.

Welcome to Relevant Knowledge Article [Retrieved Nov. 6, 1997] Internet: <URL: http://www.relevantknowledge.com/>.

Welcome to Esearch The Source for Internet Market Research Article.

*International Search Report* concerning International Application Serial No. PCT/US99/10636, European Patent Office, dated Aug. 23, 1999, 7 pgs.

*The Cookie Monster*, Harold Joseph Highland, EDPACS, vol. 24, No. 6, pp. 16-18, Dec. 1996.

"Business is blooming, thanks", *Business Week*, Nov. 20, 1995, p. 164, (McGraw-Hill, Inc., 1995).

Stuart, Peggy, "Employees buy awards with rideshare points", *Personnel Journal*, Jan. 1993, vol. 72, No. 1, p. 65, (ACC Communications Inc., 1993).

Boyle, Daniel C., "The 100 Club", *Harvard Business Review*, Mar. 1987, p. 26, (President and Fellows of Harvard College, 1987).

Dowlling, Melissa, "Sharper Image hooks up with Sprint", *Catalog Age*, Sep. 1, 1995, vol. 12, No. 9, p. 8, (Cowles Business Media Inc., 1995).

Casper, Carol, "Foodservice almanac software directory: a complete listing of packages for every phase of your operations; Directory", *ID: The Voice of Foodservice Distribution*, May 15, 1994, vol. 30, No. 6, p. 59 (Bill Communications Inc., 1994).

Cortese et al., "The Software Revolution", *Business Week*, Dec. 4, 1995, p. 78 (McGraw-Hill, Inc., 1995).

Jessell, Harry A., "QVC takes its deals online; Microsoft Network services, Brief Article", *Broadcasting & Cable*, Dec. 11, 1995, vol. 125, No. 50, p. 94 (Reed Publishing USA, 1995).

Shaffer, Richard A., "Browser Boy vs. Bill Gates", *Forbes*, Dec. 4, 1995, p. 266 (Forbes, Inc., 1995).

Whitford, David, "Three Days in Cyberspace", *Inc.*, Nov. 15, 1995, p. 57 (Goldhirsh Group, Inc. (1995).

McFadden, Mark, "Commerce on the Net.electronic commerce; Internet Resource; Technology InformationColumn", *Digital Age*, Dec. 1995, vol. 14, No. 12, p. 48 (Cardinal Business Media Inc., 1995).

Muret, Don, "Kiosks, on-line service among today's ticket agency offerings", *Amusement Business*, Jun. 19, 1995, vol. 107, No. 25, p. 5 (BPI Communications, 1995).

Baczynski, Bernadette, "What's the point of point systems? sales personnel", *Potentials In Marketing*, Aug. 1995, vol. 28, No. 8, p. 10 (Lakewood Publications Inc., 1995).

Millstein, Marc, "Electronic marketing set to take off in 1990s; electronic marketing techniques in supermarkets; management information systems, MIS Megatrends", *Supermarket News*, Oct. 9, 1989, vol. 39, No. 41, p. 33 (Capital Cities Media Inc., 1989).

McWilliams, Gary, "Small Fry Go Online", *Business Week*, Nov. 20, 1995, p. 158 (McGraw-Hill, Inc., 1995).

"Incentives spur productivity better than warning workers", *O'Dwyer's PR Services Report*, Jul. 1995, p. 41 (J. R. O'Dwyer Co., Inc., 1995).

"'NAPA Advantage' dealer incentive.National Automotive Parts Association's customer-incentive membership program", *Automotive Marketing*, Jan. 1996, vol. 25, No. 1, p. 22 (Chilton Company, 1996).

Thayer, Warren, "Database marketing demystified; using point of sale information to find out more about customers; includes related articles", *Progressive Grocer*, Nov. 1989, vol. 68, No. 11, p. 21 (Maclean Hunter Media Inc., 1989).

Hequet, Marc, "Non-sales incentive programs inspire service heroes; includes related case study; Reward & Recognition", *Training: the Magazine of Human Resources Development*, Aug. 1990, vol. 27, No. 8, p. 53 (Lakewood Publications Inc., 1990).

Schmeh, Al, "Electronic marketing: a strategy for survival: Forum", *Chain Store Age Executive with Shopping Center Age*, Jun. 1992, vol. 68, No. 6, p. 50 (Lebhar-Friedman Inc., 1992).

"Net Gains", *Marketing Week*, Jul. 28, 1995, p. 33 (Centaur Communications Ltd., 1995).

Dunkin, Amy and McWilliams, Gary, "Netting New Business on the Net", *Business Week*, Aug. 21, 1995 (p. 84 (McGraw-Hill, Inc., 1995).

Desmond, Edward W., "Can Japan Catch the Wave?; The One-Time Technology Leader Is Struggling In The Race With The U.S. Down The Information Highway", *Time*, Feb. 27, 1995, p. 40 (The Time Inc. Magazine Company, 1995).

Morris, Hal, "For The Thrifty Business Traveler", *Nation's Business*, Oct. 1995, p. 36 (U.S. Chamber of Commerce, 1995).

Webpage of Yahoo Feb. 14, 1998 see "http://web.archive.org/web/*/http://www.yahoo.com".

*International Search Report* concerning International Application Serial No. PCT/US99/923 041.0-2221, European Patent Office, dated Dec. 3, 2003, 8 pages.

* cited by examiner

DEMOGRAPHIC INFORMATION GATHERING AND INCENTIVE AWARD SYSTEM AND METHOD

TECHNICAL FIELD OF THE INVENTION

The present invention relates in general to gathering demographic information and in particular to storing identification information, storing request information, and awarding incentive points in a networked environment.

BACKGROUND OF THE INVENTION

Networked environments such as the Internet allow people using local network devices to request information from remote network devices. Typically the local network device is a personal computer (PC) executing client software (e.g., a web browser); the remote network device is a server executing server software; and the network is the Internet. The requested information could be a web page containing information related to a hyperlink. For example, a user (web site visitor) may request a web page about baseball, from a more general web page about sports, by selecting a picture of a baseball with a pointing device such as a mouse. Once the selection is made, the local device sends a message to the remote device via the network. The message typically includes the domain and the name (i.e., the address) of the requested information, as well as information identifying the local device. Often, several messages are exchanged between the client and the server, further specifying the identity and capabilities of the local device.

Frequently, the proprietor of a particular web site desires information about the people requesting information from his web site. This demographic information allows the proprietor to tailor the content of his web site to the preferences of its visitors. For example, if a particular page is visited frequently by a particular demographic group (e.g., teen males), then the web site proprietor could target that demographic group when selecting content such as advertising banners. Ordinarily, only limited demographic information such as browser version and the address of the local device are available for collection by the server. This limited demographic information is typically inadequate for most content tailoring, because it contains very little personal information about the visitor.

A common technique to overcome this drawback is to develop a profile for each visitor by requesting or requiring each visitor to fill out a questionnaire on their first visit. Profile information gathered from the questionnaire is then stored locally in a small file called a cookie on the visitors PC. Alternatively, the information is stored on the server and correlated to an identification number or password associated with the visitor. Regardless of the manner in which the profiles are stored, each time the visitor returns to the web site, his profile information is associated with the requests he makes, creating transaction information for subsequent analysis and content tailoring.

However, this technique suffers from certain drawbacks. Often, visitors are irritated by the inconvenience of multiple questionnaires from multiple web sites asking the same questions over and over. In fact, this may have the detrimental affect of averting visitors from such sites. Further, many visitors are unwilling to disclose personal information for fear it may compromise their privacy. Often, visitors prefer anonymous browsing in an effort to reduce junk e-mail. Although many web sites guarantee anonymity, others do not. Investigating individual proprietors privacy policies while browsing can be burdensome. Still further, collection of demographic information by individual proprietors precludes analysis by that proprietor that goes beyond his particular web site. For example, a web site proprietor may want to know what percentage of visitors to any web site (not just his own) are teen males.

SUMMARY OF THE INVENTION

In accordance with a first aspect of the invention, an information gathering system for use with at least two web sites on the Internet is provided. The system comprises a profile server including a database containing information concerning participating web site visitors. The system further comprises first means associated with a first one of the at least two web sites for determining whether a web site visitor to the first web site is one of the participating visitors. Still further, the system comprises second means associated with a second one of the at least two web sites for determining whether a web site visitor to the second web site is one of the participating visitors. Additionally, the system comprises means for developing demographics information from the database and from the first and second determining means concerning the visitors to the first and second web sites.

In some preferred embodiments, the system further comprises first means for awarding an incentive award to participating web site visitors to the first web site. In some such preferred embodiments, the first awarding means awards the incentive award on a first identified visit. In other such preferred embodiments, the first awarding means awards a second incentive award for a subsequent visit if the subsequent visit occurs after a predetermined period of time. In some embodiments, the first awarding means refuses to award a second incentive award after the first incentive award. In certain embodiments, the size of the incentive award is defined by the first web site. In any of the foregoing embodiments, the first awarding means may award the incentive award in response to a task. In such an instance, the task may be responding to a question.

In some preferred embodiments, the system further comprises second means for awarding an incentive award to participating web site visitors to the second web site. In some preferred embodiments, the first and/or second determining means is located proximate to a server associated with the first and/or second web site. In some such preferred embodiments, the first and/or second determining means is located proximate to the profile server.

In some preferred embodiments, the first and/or second determining means receives identification information. In some such embodiments, the identification information comprises encrypted identification information.

In accordance with a further aspect of the present invention a demographic information gathering system for use in a networked environment having first and second networked devices is provided. The system comprises a database server for storing profile information and identification information associated with a participant. The system further comprises a third networked device and means responsive to a signal from the third networked device for determining whether the third networked device is the participant and for identifying an intended network device by determining whether the signal was a request for information from the first networked device or a request for information from the second networked device. Still further, the system comprises means responsive to the determining means for associating identification information associated with the third networked device with the intended network device, wherein the association is subsequently stored by the database server. Additionally, the system comprises means for sending a second signal to the third networked device identifying a redirected network location.

In some preferred embodiments, the redirected network location comprises an address of the intended network device. In some preferred embodiments, the system further comprises means for identifying a profile specific network location. In some such preferred embodiments, the redirected network location comprises the profile specific network location. In some preferred embodiments, the system further comprises means for adjusting incentive points associated with the participant. In some such preferred embodiments, the networked environment comprises the Internet. In other such preferred embodiments, the database server comprises a third networked device. In some embodiments, the database server comprises a fourth networked device for storing the demographic information and a fifth networked device for storing the identification information. In certain embodiments, the first networked device comprises a personal computer. In any of the foregoing embodiments, the determining means, associating means, and/or adjusting means comprise software instructions operating in a microprocessor.

In accordance with yet a further aspect of the present invention, an apparatus for recording predefined actions related to first and second domains is provided. The system comprises a database server for storing transaction and identification information. The system further comprises means for receiving a request for information related to a domain and for receiving identification information associated with a user. Still further, the system comprises means for determining whether the requested information is related to the first or second domain. Additionally, the system comprises means for determining whether the user is identified in the database and means for modifying the transaction information based on the request and the identification information.

In accordance with another aspect of the present invention, a method for recording predefined actions in first and second domains is provided. The method comprises the step of receiving a request for information related to a domain. The method further comprises the step of determining whether the requested information is related to the first or second domain. Still further, the method comprises the step of receiving identification information associated with a first user. Additionally, the method comprises the step of associating the request for information with the determined domain.

In some preferred embodiments, the system further comprises the step of transmitting a representation of the requested information. In such an instance, the representation may comprise a web page or web page address. In some such preferred embodiments, the system further comprises the step of adjusting incentive points. In other such preferred embodiments, the step of receiving the request for information comprises receiving a transport protocol message. In some embodiments, the requested information comprises web page information. In certain embodiments, the request comprises a web page address.

In some preferred embodiments, the identification information comprises a network address, an identification number, and/or a user name. In some such preferred embodiments, the system further comprises the step of determining whether the user is associated with a predefined profile type. In other such preferred embodiments, the system further comprises the step of transmitting an e-mail message to the user. In such an instance, transmitting comprises composing and/or selecting the e-mail message based on a predefined profile associated with the user and/or based on the request.

In accordance with yet another aspect of the present invention, a method comprises the step of receiving a request for information stored on a first remote device from a second remote device. The method further comprises the step of receiving an identifier associated with the second remote device from the second remote device. Still further, the method comprises the step of determining if the second remote device is a member of a predefined set of identifiers. Additionally, the method comprises the step of storing a representation of the request relationally with a representation of the second remote device. The method further comprises the step of transmitting an instruction to the second remote device, wherein the instruction directs the second remote device to request the information from a third remote device.

BRIEF DESCRIPTION OF THE DRAWINGS

These and other features and advantages of the present invention will become more apparent from a detailed consideration of the following detailed description of certain preferred embodiments when taken in conjunction with the drawings in which.

DETAILED DESCRIPTION OF THE PREFERRED EMBODIMENTS

Although the following description focuses on the Internet connecting personal computers to servers, persons of ordinary skill in the art will readily appreciate that the techniques of the present invention are in no way limited to the Internet, personal computers, or servers. On the contrary, any system which might benefit from tracking usage, relating that usage to user profiles, and/or from motivating users to use the system in predetermined ways may employ the techniques shown herein.

Figure 4:
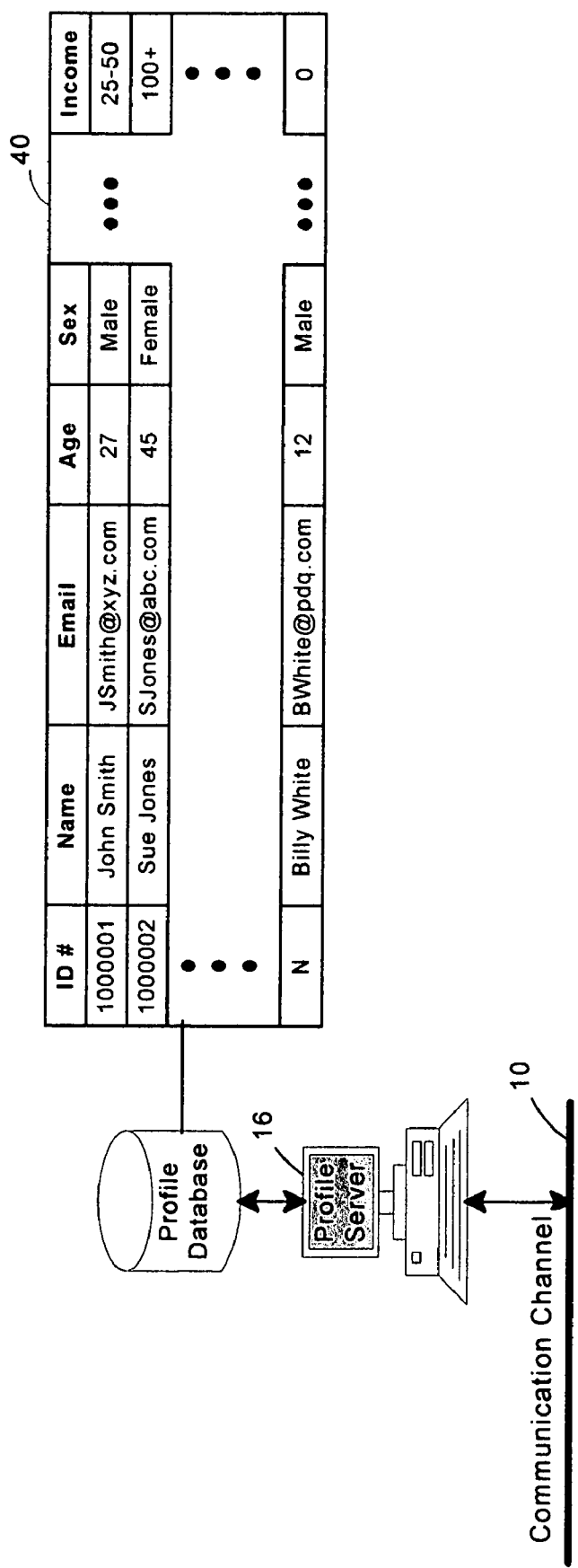
FIG. 4 is a block diagram showing a profile server, suitable for use as the profile server depicted in FIG. 1, along with a profile database.

Generally, a system employing the present invention provides web site proprietors with demographics information about the users who visit their web sites. Further, the system provides web site visitors with incentive awards (i.e. points) in exchange for interacting with the web sites in a predefined manner. Anyone who uses the Internet can be a participating web site visitor. To participate, a user must visit a registration web site and complete a questionnaire. The questionnaire is designed to solicit various demographics data of interest to web site proprietors. For example, a profile may include a participating user's age, income, occupation, etc. Once the questionnaire is completed, a profile server 16 sets up an account for the newly subscribing user and saves the user's demographic profile to a database 40 (see FIG. 4). Significantly, the user need only register once. Optionally, the participant may thereafter earn additional points by completing supplementary questionnaires. These new questionnaires expand the user's profile with new information or update the user's profile when information becomes outdated.

The profile information is then associated with identification information unique to the participant and stored in memory. The profiles (i.e., profile information with identification information) are preferably stored in a database 40 on a profile server 16 (see FIG. 4). However, each profile could be stored on the associated user's local device or in some other manner. In any event, the identification information is stored on the user's local device, typically as a cookie, to identify the user on subsequent visits to participating sites. Preferably, the identification information comprises a unique alphanumeric string (e.g., a serial number).

After registering, a user can enjoy the benefits of the system by visiting the web sites of one or more participating web site proprietors. Preferably, the web sites of participating proprietors will include a message identifying the site as one included in the program. For example, a logo indicating the number of points that may be earned could be displayed on an ad banner. The system automatically awards points to deserving users without requiring the users to manually leave the web site awarding the points. In this sense, the system is distributed. It works behind the scenes of numerous, typically unrelated web sites to record predefined actions and to award points to visiting registered users.

Periodically, the system develops a report for each participating web site proprietor. Each report provides a demographics profile of the participating users that interacted with that particular site in a predefined manner. Further, the report can include aggregated demographics information. The report is developed from transaction information gathered when a user interacts with a web site in a predefined manner and the system's database 40 of demographic profiles for participating users.

If they wish, each individual site proprietor can customize their site to request participating visitors to perform certain tasks such as answering questions or visiting certain pages. By performing the requested tasks, the participating user will be awarded points that can be redeemed for products or services at a later date. However, specific tasks need not be required in this manner. Instead, merely visiting a participating web site is preferably sufficient to obtain award points.

In addition to the registration site, the system provides redemption sites which participating users can visit to convert the points accumulated by visiting sites into products or services. The system automatically accepts redemption orders, places purchase orders with vendors for the requested product or service, and, where applicable, directs the vendor in question to deliver the redeemed products to the redeeming user. The points are automatically deducted from the participant's account, preferably located on a profile server 16.

A significant feature of the system is its ability to permit web site proprietors to create their own business rules governing the distribution of points. For example, a web site proprietor can select any number of points to be given visiting users; can specify activities or questions that must be completed by the visitor before points are awarded; and/or can limit the frequency at which users can be awarded points for visiting the site (e.g., once a year, once a month, etc.). As a further example, a web-site owner can provide two questionnaires to visitors and award more points to visitors that answer the more extensive questionnaire than to visitors that choose to answer the more limited questionnaire. The points a web site awards are preferably purchased from a central provider at a premium over their redemption value. For example, an apparatus 8, as described below, could serve as such a central provider.

Figure 1:
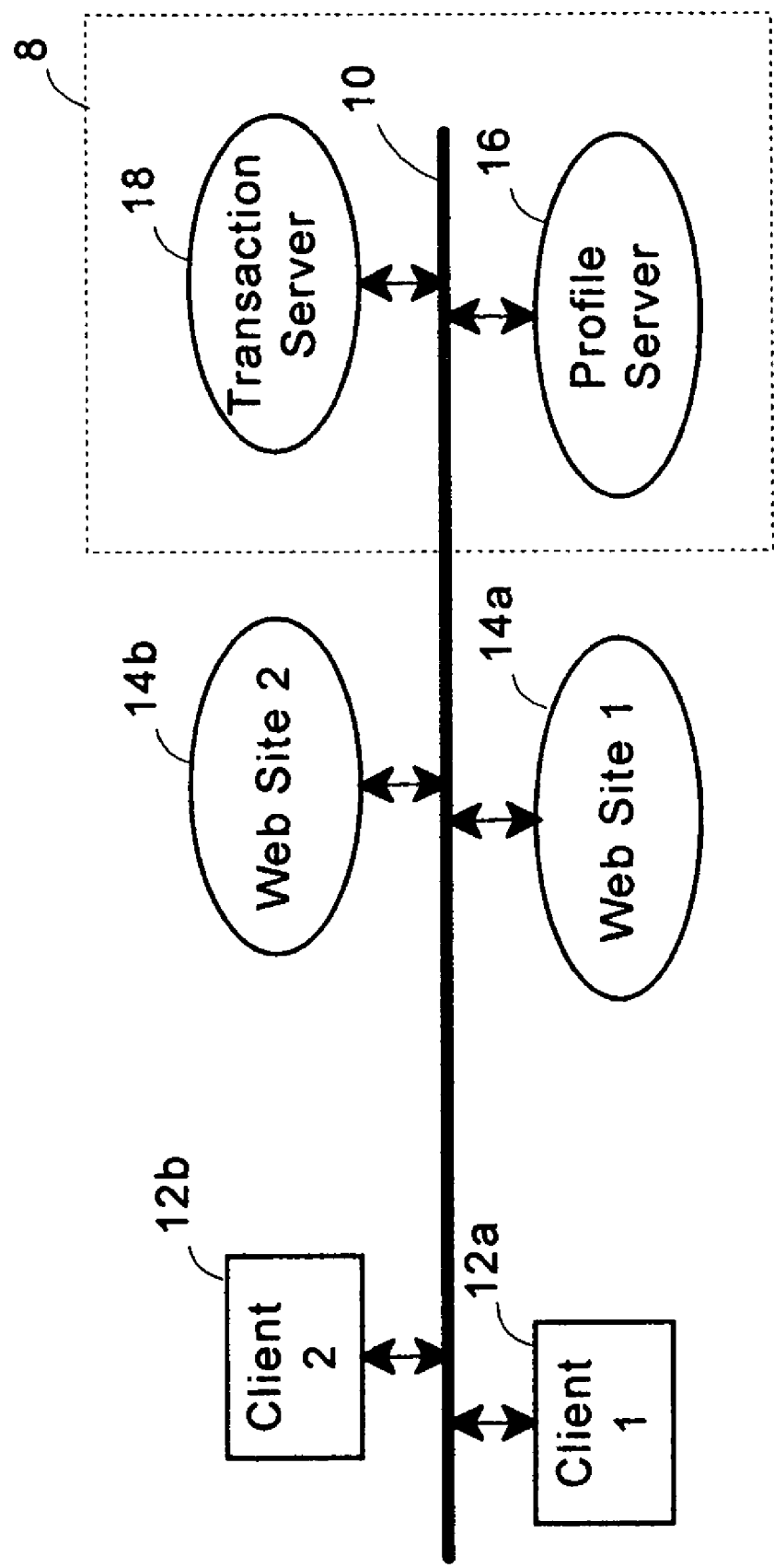
FIG. 1 is a block diagram of a computer network capable of utilizing the present invention.

Apparatus 8 constructed in accordance with the teachings of the invention is shown in FIG. 1 in a preferred embodiment. A communication channel 10 is shared by the apparatus 8, a plurality of clients 12, and web site servers 14. A client 12 is a consumer of information (e.g., a web site visitor) and a web site server 14 is a provider of information. Although a client could take on many forms, such as a telephone, pager, kiosk, teller machine, reservation system, etc., in the typical case for the Internet, the client 12 is implemented as a web browser on a personal computer.

Figure 2:
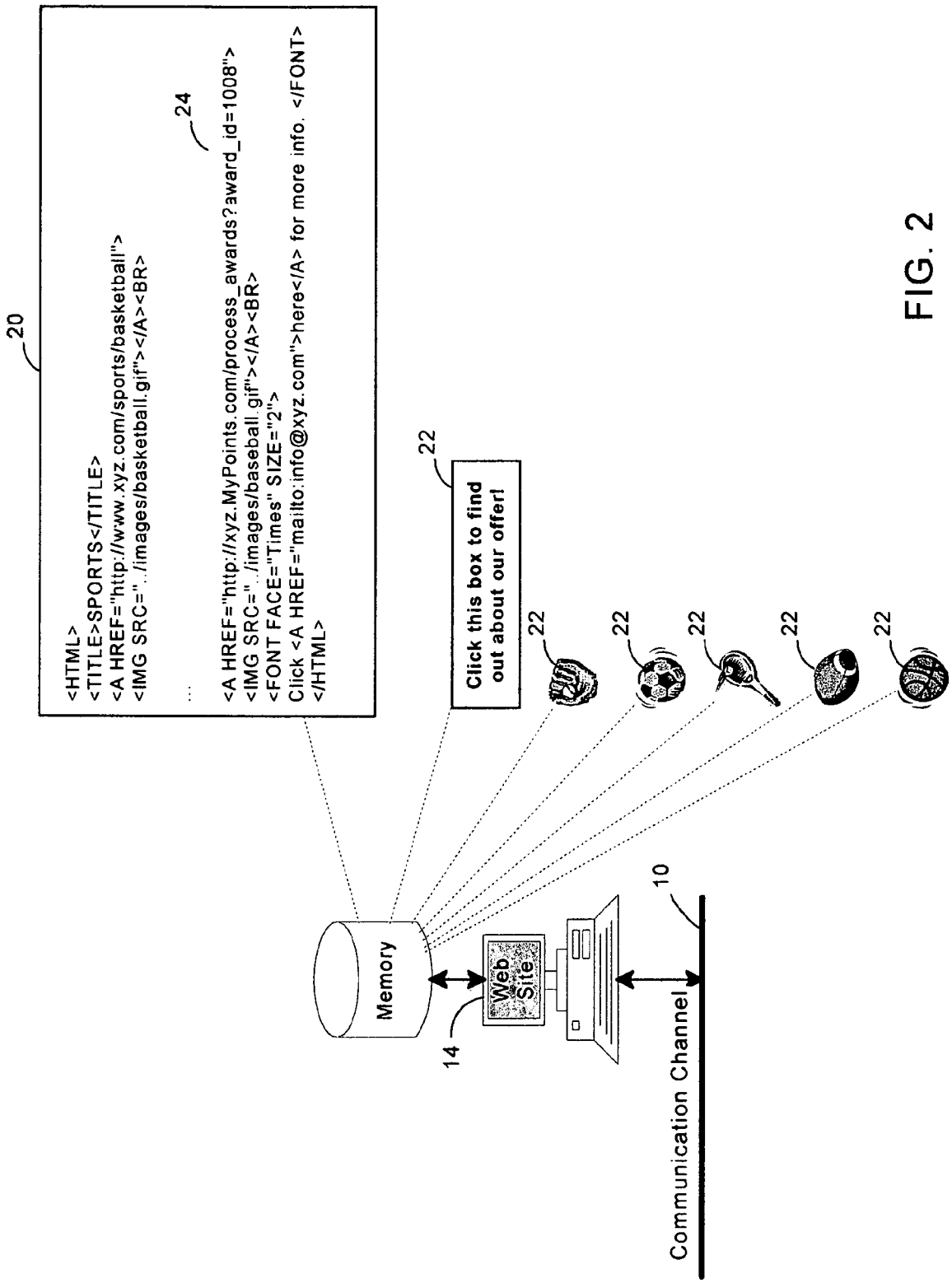
FIG. 2 is a block diagram showing a web site, suitable for use as the web site depicted in FIG. 1, along with the data files it serves.
Figure 3:
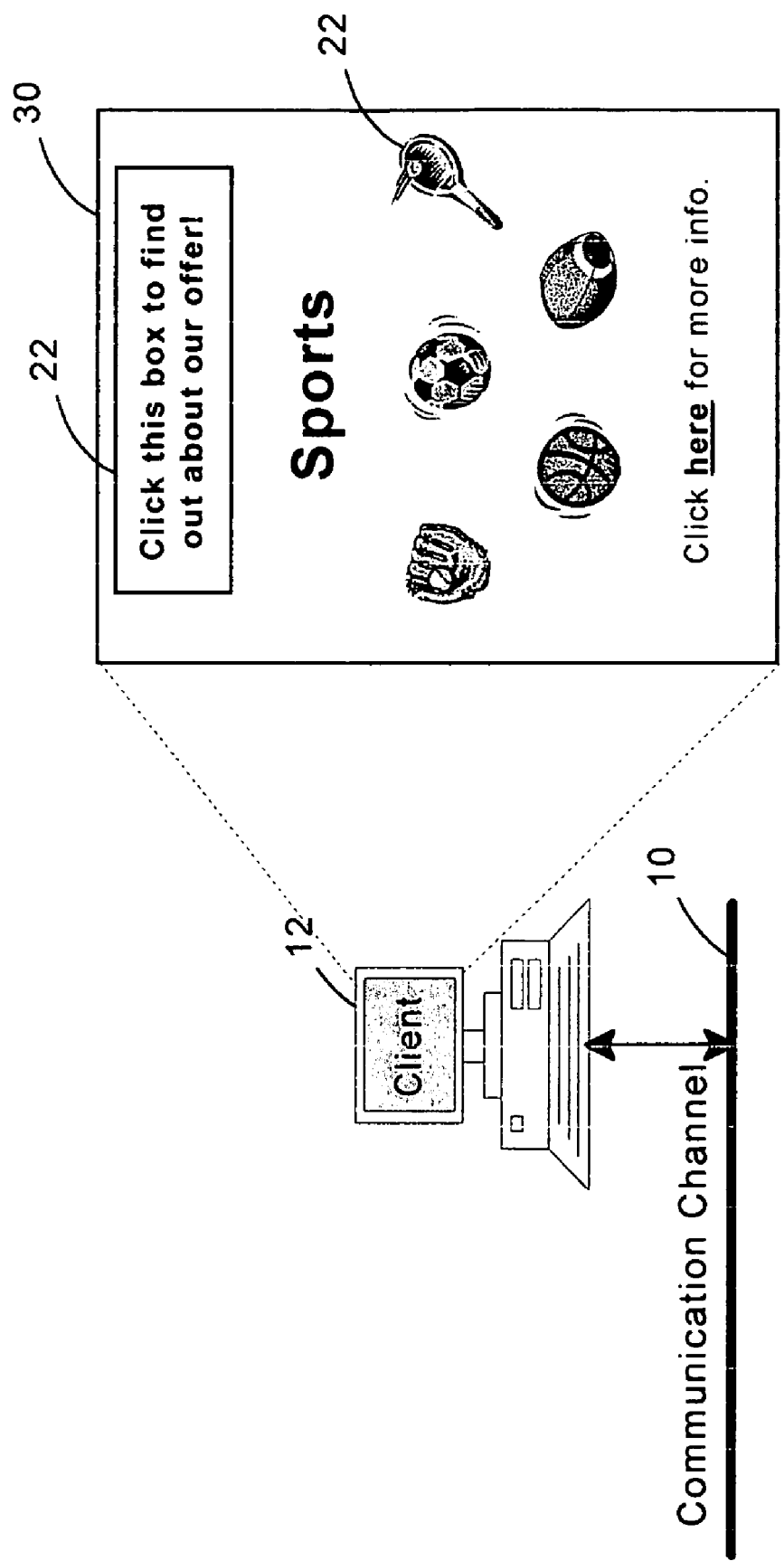
FIG. 3 is a block diagram showing a client, suitable for use as the client depicted in FIG. 1, along with a constructed web page.

Clients 12 request pages of information from the web sites 14 by transmitting a request message to an address where desired information is located. Typically this is accomplished by selecting a hyperlink that points to the desired page. Hyperlinks are usually pictures or highlighted words. A user may select the hyperlink in a variety of known ways. For example, the user could click on the hyperlink with a mouse or other pointing device. The user may or may not be a participating user (i.e., profile information may or may not be stored in the apparatus 8 for this user). The address specifies the name of the desired page and the domain in which it is located. For example, "www.xyz.com/sports" specifies the sports page in the www.xyz.com domain. In the typical instance, the web site 14 receives the request and responds with a markup file 20 such as a Hyper Text Markup Language (HTML) file. The markup file 20 specifies the layout of the requested page and any content files 22 needed to construct the page (see FIG. 2). Subsequently, the client 12 receives the markup file 20 and makes further requests for the content files 22. As the files are received, the constructed page 30 is displayed on the client 12 (see FIG. 3).

Typically, hyperlinks point to a page associated with the link. For example, a picture of a baseball might lead to a web page about baseball. However, in the preferred embodiment, participating web sites may include hyperlinks that appear to point to an associated page, but actually point to a transaction server 18 resident in the apparatus 8 (see FIG. 1 and FIG. 5). Preferably, included in the hyperlink information is an award id 24. The combination of the award id 24 and the address of the hyperlink is unique within the domain of this web page. Further, all domain names are unique, therefore, the combination of domain name, address, and award id 24 is unique across the entire network and may be used to determine the ultimate destination of a hyperlink.

When a user selects a hyperlink that points to the transaction server 18, messages are transmitted to the transaction server 18. These messages may include the award id 24 associated with that hyperlink, user identification information, and the intended destination of the hyperlink. In the preferred embodiment, the intended destination is developed by translating the award id 24 into a network address via a look-up table. For the purpose of properly processing received messages, the apparatus 8 is provided with means for determining whether the user associated with a received message is a registered user. Preferably, the determining means makes this determination by receiving the identification information stored on the user's local device (e.g., the cookie). If the local device responds with valid identification information, then the user is a registered participant. However, if valid identification information is not received, then the user is determined not to be a participant. In the preferred embodiment the identification information is encrypted when received and, therefore, decrypted by the determining means. Alternatively, identification information could be retrieved from the local device for the purpose of checking it against a local list of registered participants. Instead of a local list, the transaction server 18 could query the profile server 16 to access data stored on that server. Optionally, the transaction server 18 and the profile server 16 could be implemented as the same device. In an alternate embodiment, means associated with the participating web sites determine whether a web site visitor is one of the participating visitors. For example, software instructions operating in a microprocessor could query the registration server to determine if a web site visitor is a participating visitor. Alternatively, the participating web site could search a local list of participating visitors.

If the transaction server 18 determines that the user is not a participant, then it translates the award id 24 into an address that does point to an associated page (e.g., picture of baseball to a baseball page). This translation is preferably performed with a look-up table. However, persons of ordinary skill in the art will readily appreciate that the associated page could be determined by parsing the transmitted messages. For example, the address the hyperlink actually points to could embed the address of the desired or associated web page. Subsequently, the transaction server 18 preferably sends a message to the client 12 redirecting it to the associated page. The client 12 then requests the associated page from the appropriate web site 14. Alternatively, the non-participating user could be redirected to a registration page or temporarily shown a page about how points could have been earned if he were registered, and then subsequently redirected to the associated page.

Figure 5:
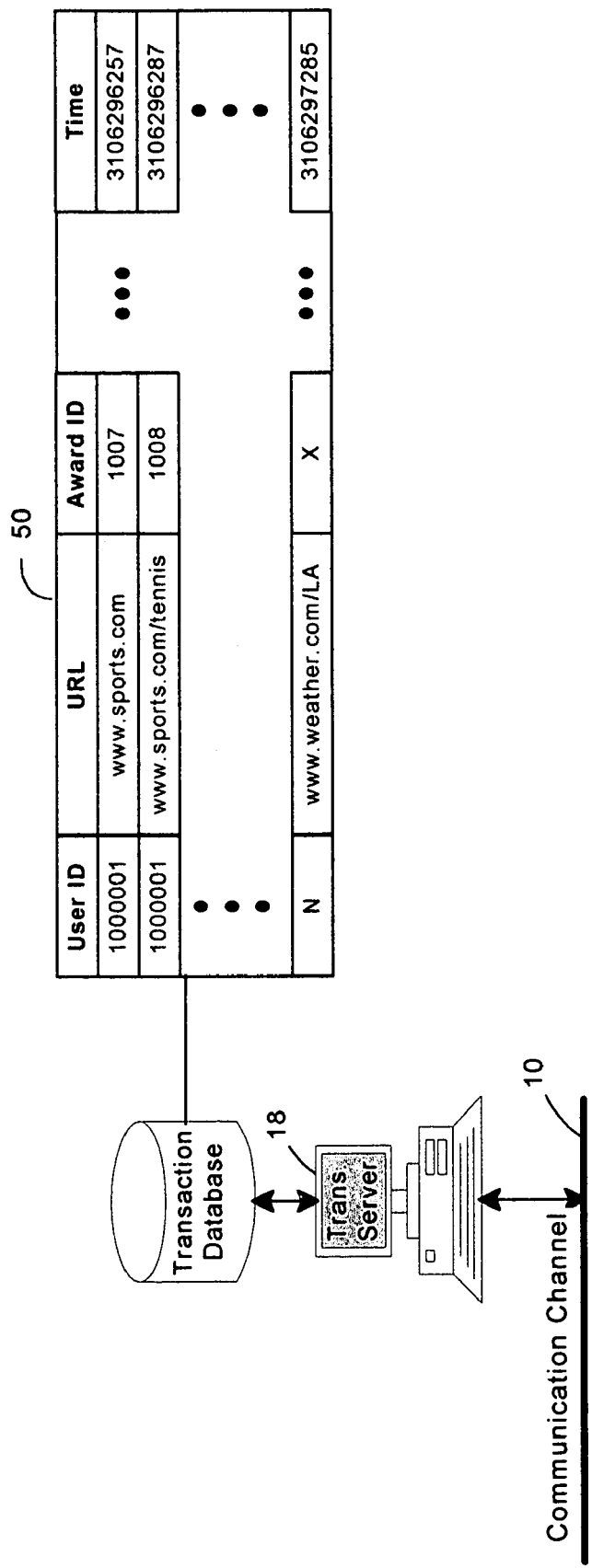
FIG. 5 is a block diagram showing a transaction server, suitable for use as the transaction server depicted in FIG. 1, along with a transaction database.

If the transaction server 18 determines that the user is a participant, it records data associated with the transaction in a transaction database 50 (see FIG. 5). For example, the transaction database 50 may include the participant's identification information, the award id, the address of the desired web page, and the time of the request. Alternatively, the data associated with the transaction could be stored by the profile server 16.

Optionally, the transaction server 18 includes means for awarding incentive points to participating web site visitors. Although a person with ordinary skill in the art will readily appreciate that the awarding means can be implemented in many ways without departing from the scope of the invention, in the preferred embodiment the awarding means is implemented by software instructions operating in a microprocessor resident in apparatus 8.

Preferably, certain conditions must be met before points are awarded. These business rules are preferably unique to a participating web site and are preferably defined by that web site's proprietor. The business rules are preferably stored on the transaction server 18 and indexed by the award id. However, the business rules could optionally be stored on another server and retrieved. To determine if the participant identified by the identification information is eligible for the award identified by the award id, the awarding means tests the rules against circumstances specific to the participant. For example, the awarding means may award points because it determines that this visit is a first visit by this participant. Similarly, the awarding means may award points because it determines that a predetermined amount of time has elapsed since this participant's last visit. The size of the award (i.e., number of points awarded) could vary from visit to visit and is preferably determined by the web site(s). Further, the awarding means may refuse to award points because it determines that this visit is not the first visit by this participant. Similarly, the awarding means may refuse to award points because it determines that a predetermined amount of time has not elapsed since this participant's last visit. Optionally, the participant may earn points by completing certain tasks. For example, the participant may be asked to respond to a question or series of questions in exchange for a predetermined number of points.

Each web site could have a local business rule determining means or web sites could share one or more centralized determining means. For example, the determining means may be located proximate to a server associated with a web site. Alternatively, the determining means may be located proximate to the registration server. Further, the circumstances specific to each participant may be stored at the transaction server 18, on each participant's client, and/or on the profile server 16. In the event that information stored on a remote device is required to resolve a business rule, the determining means could query the appropriate device.

Preferably, if points are awarded the transaction is recorded and the award id 24 is translated into an address that points to an associated page. Optionally, zero points may be awarded for tracking predefined activities. As in the non-participant case, the transaction server 18 preferably sends a message to the client 12 redirecting it to the associated page, and, the client 12 requests the associated page from the appropriate web site 14. Alternatively, the participating user could optionally be temporarily shown a page about how many points he earned, then redirected to the associated page; or, the participating user could optionally be redirected to a page based on his profile information. For example, a participant requesting information about local restaurants could be redirected to a page that is local to him based on his address. Periodically (e.g., once a day), the participant's account is updated using the transaction information.

The apparatus 8 is preferably provided with means for developing demographic information concerning visitors to web sites 14. This developing means can be implemented as means for associating the demographic information of a participating user with a visited web site 14. The developing means or the associating means may include software instructions operating in a microprocessor that correlate the web page visited and visitor identification information with information in the profile database. For example, the percentage of males visiting a particular web page or web pages could be calculated by looking up each participating visitor in the profile database, checking a field in the database for sex, and tabulating the results.

If, due to the controlling business rules of the visited site 14, no points are awarded, the transaction may be still recorded, but the participant's account is not updated. As before, the award id 24 is translated into an address that points to an associated page. Preferably, the transaction server 18 sends a message to the client 12 redirecting it to the associated page, and, the client 12 requests the associated page from the appropriate web site 14; or, the participating user could optionally be redirected to a page based on his profile information. Alternatively, the participating user could be temporarily shown a page informing him that no points were awarded, then redirected to the associated page.

Figure 6:
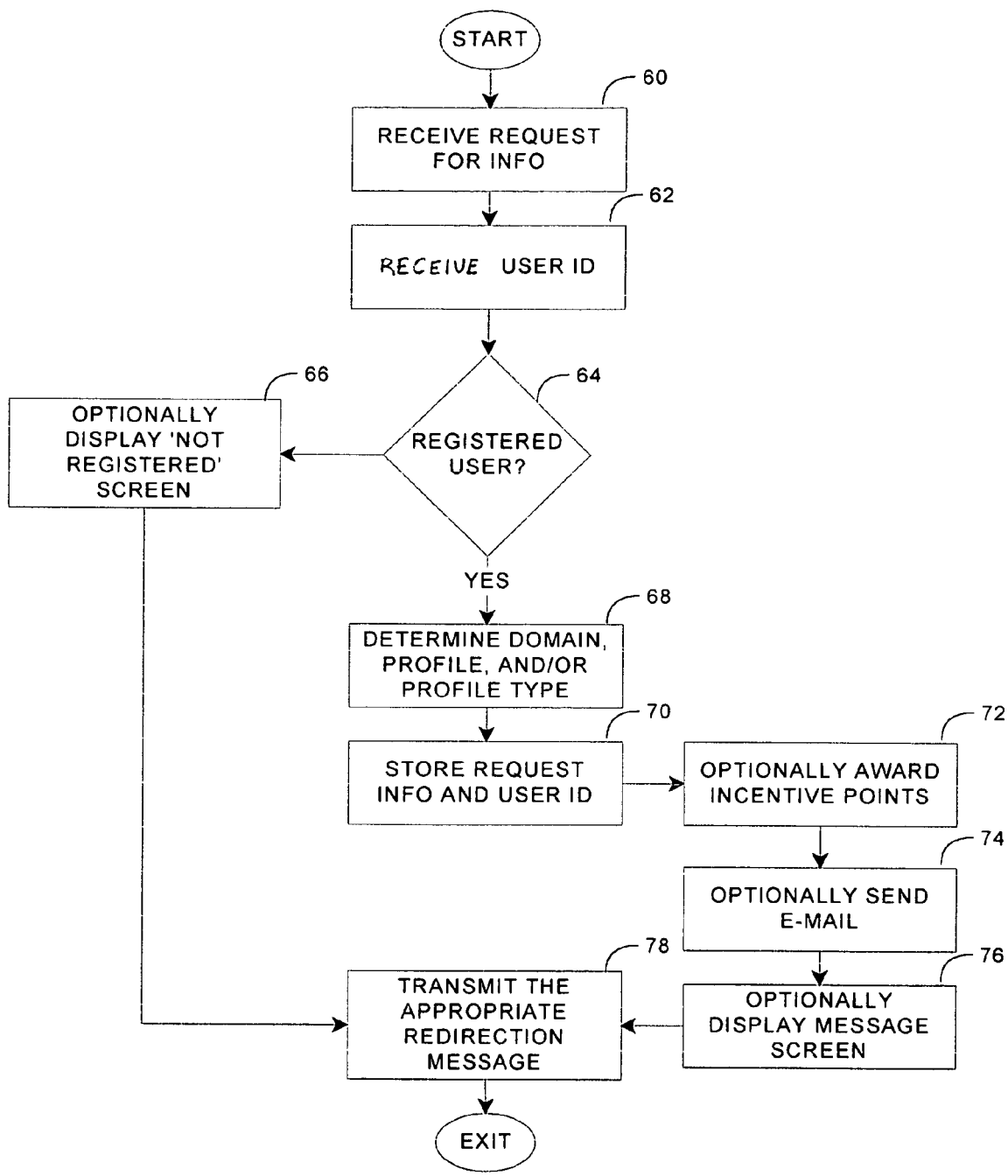
FIG. 6 is a flowchart of a program that can be implemented by the transaction server 18 to monitor network usage; and, FIG. 7 is a block diagram of an apparatus, suitable for use as the apparatus depicted in FIG. 1.

A flowchart of a program that can be implemented by the transaction server 18 to monitor network usage in accordance with the teachings of the present invention is illustrated in FIG. 6. The programmed steps are typically performed by a control circuit such as a microprocessor as is conventional. Once the program is initiated the control circuit waits until it receives a message, such as a request for information from a particular network address (block 60). Preferably the request is a transport protocol message such as a hypertext transport protocol (HTTP) message. Typically, the information (e.g., a particular web page) is related to a particular domain in the network (e.g., a particular web site).

Subsequently, the control circuit receives identification information from the client 12 making the request (block 62). The identification information may be any identifier such as a network address, an identification number, and/or a user name. Accordingly, the control circuit determines whether the user is a registered user (block 64) by waiting for valid identification information. If valid identification information is received, then the user is a registered user. Preferably, the identification information is an encrypted cookie. Alternatively, the identification information is checked against a predefined set of registered users. In the event that the control circuit determines that the client 12, browser, or the identification information is not associated with a registered user, it optionally transmits information to display a message informing the user about how points could have been earned if he were a registered participant (block 66). Subsequently, the control circuit transmits additional information to the client 12 from which the identification information originated (block 78). This additional information preferably includes a message redirecting a browser on the client 12 to request the desired information from the appropriate location; or, the participating user could optionally be redirected to a page based on his profile information.

In the event that the control circuit determines that the client 12, browser, or the identification information is associated with a registered user (block 64), it may determine what domain the requested information is related to (block 68). Typically, the domain name is included in the hyperlink and in the message requesting the information. For example, a request for a desired web page includes the address of the web page, which includes the domain. Alternatively, the domain name may be in the look-up table used to translate an award id into an intended destination.

Further, the control circuit may determine whether the user is associated with a predefined profile type. For example, the control circuit may be programmed to determine if the user is male. This determination can then be used in a variety of ways. For example, it could be stored in the transaction database 50, included in a report, used to determine the number of incentive points to award, or used to determine what messages to transmit. To determine if a user matches a predetermined profile type the control circuit could query the profile database 40 using the received identification information and compare the results of the query with the predetermined profile type. Alternatively, any other database containing the appropriate information could be used (e.g., a subset of the profile database located on the transaction server 18).

Subsequently, the control circuit associates the request for information with the identification information and preferably stores the associated data in a database 50 on the transaction server 18 at a block 70 (see FIG. 5). However, the database may be stored on the profile server 16, on a client 12, on several clients 12, or on some other device. Further, the database could be queried over the communication channel 10 or over some other communication means such as a dedicated connection. Optionally, the control circuit awards or adjusts incentive points (block 72). The number of incentive points awarded is preferably based on business rules established by the web site proprietor. The business rules are preferably stored on the transaction server 18. However, the business rules may be stored on the profile server 16, on a client 12, on several clients 12, or on some other device. The business rules compare the current transaction to relevant parameters such as time since last related award and profile information to determine the number of points to be awarded.

Further, the control circuit may transmit other messages, such as an e-mail message (block 74). The e-mail message could be composed based on the predefined profile associated with the user. For example, if a registered user requests information related to a new car purchase, a dealer in the user's area could be determined by the user's location information, and a personalized invitation for a test drive could be sent to the user on behalf of the dealer if the user is over a certain age and income level. Still further, the control circuit may transmit other messages, such as information to display a message informing the user about how many points were awarded or that no points were awarded and why no points were awarded (block 76). For example, on a first visit a participating user may be informed that he earned 500 points, but on a subsequent visit on the same day the participating user may be informed that no points were awarded and that he should return in 24 hours.

In response to receiving the request for information, the control circuit transmits a representation of the requested information (block 78). For example, the representation may be a web page, or the network address of a web page instructing the client 12 to request the information from a particular web site 14 (e.g., a redirection message). As a result the desired information is typically displayed on the client 12.

Figure 7:
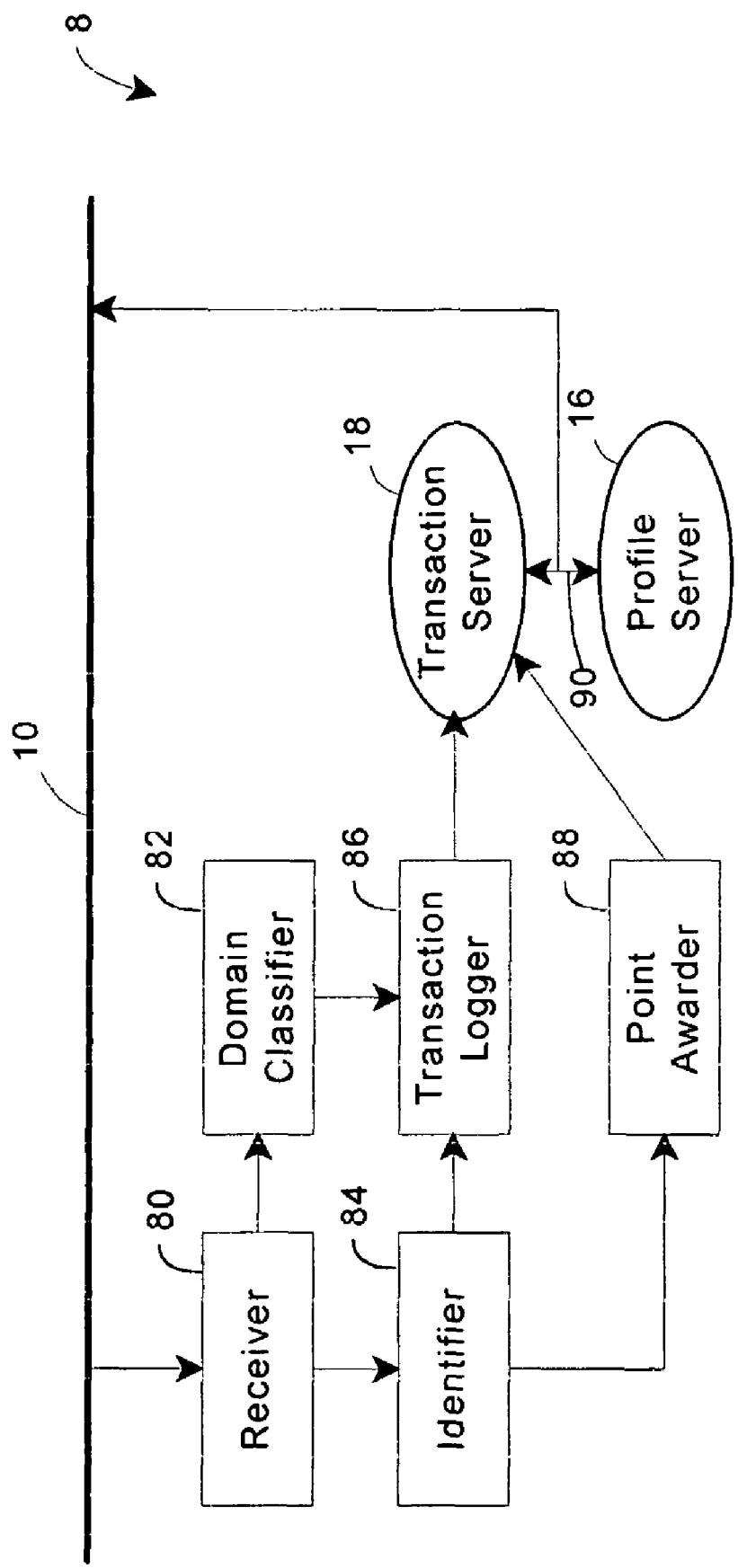

A block diagram of a device suitable for use as the apparatus 8 is illustrated in FIG. 7. The device comprises a set of coupled circuits, such as software instructions operating in a microprocessor. Messages requesting information arrive over the communication channel 10. Means for receiving, such as a receiver circuit 80, capture the message for processing in a known manner. The domain of origin and/or the domain of the desired information is determined by means for determining, such as a domain classifier circuit 82. Preferably, the domain classifier 82 parses the message to determine the domain of origin and/or the domain of the desired information. Similarly, means for determining whether the user is identified in a database, such as an identifier circuit 84, examines the message for identification information. Preferably, the identification information is a cookie sent by the client 12. Portions of the message, including the domain and identification information are preferably stored by means for modifying. For example, a transaction logger 86 may send instructions to the transaction server 18 for such purposes. Similarly, means for storing and adjusting incentive points, such as a point awarder circuit 88, modify point information on the transaction server 18. Means for transferring information 90 between the transaction server 18 and the profile server 16 allow information destined for one to be stored on the other and then updated. For example, the transaction information is preferably transferred to the profile server periodically.

Means for transferring preferably include a transceiver on each of the devices and a network connection.

In summary, persons of ordinary skill in the art will readily appreciate that a demographic information gathering and incentive award system and method have been provided. Users of systems implementing the teachings of the present invention can enjoy network browsing with increased privacy, unfettered by redundant questionnaires. Further, these users may be rewarded for their activity. Proprietors of such systems can benefit from the collection of demographic information across domains as well as increased traffic.

The foregoing description has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

What is claimed is:

1. A distributed information gathering system for use with at least two web sites on the Internet, the system comprising:
    a plurality of independent participating web sites providing a plurality of content information;
    a profile server including a database storing a plurality of client profiles wherein each of the plurality of client profiles is established by a participating client;
    a transaction server communicatively connected to the profile server and the plurality of independent participating web sites, the transaction server configured to receive an information request from one of the plurality of independent participating web sites initiated by the participating client at one of the plurality of independent participating web sites, wherein the information request includes a request to retrieve content from a web server that is independent of the transaction server and the profile server, the content including a different one of the plurality of participating web sites, the transaction server further including;
    a control circuit communicatively coupled to the profile server and the transaction server and programmed to execute:
        a demographics routine to determine client demographic information based on the received information request initiated by the participating client at one of the plurality of participating web sites and the client profile corresponding to the participating client, wherein the received information request is stored on the transaction server and the client profile is stored on the profile server;
        an incentive award routine to award incentive points to the participating client in response to the received information request initiated by the participating client at one of the plurality of participating web sites, to store the awarded incentive points on the profile server for future redemption by the participating client, to award the incentive award on a first visit to one of the plurality of participating web sites, and to award a second incentive award for a subsequent visit if the subsequent visit occurs after a predetermined period of time; and
        a redirection routine to send a redirection message to the participating website at which the participating client initiated the information request that redirects the participating client to the different one of the plurality of participating web sites, where in the redirection message is sent from the transaction server.

2. The system as defined in claim 1, wherein the size of the incentive award is defined by one of the plurality of participating web sites.

3. The system as defined in claim 1, wherein the incentive award routine awards the incentive award in response to a task.

4. The system as defined in claim 3, wherein the task is responding to a question.

5. The system as defined in claim 1, wherein the transaction server comprises software executed as a part of one of the plurality of participating web sites.

6. The system as defined in claim 1, wherein the profile server comprises software executed as a part of one of the plurality of participating web sites.

7. The system as defined in claim 1, wherein the redirection messages comprises a network address corresponding to one of the plurality of participating web sites.

8. The system as defined in claim 1, wherein the profile server organizes the plurality of client profiles to identify a profile specific network location.

9. The system as described in claim 8, wherein the redirection message comprises a network address corresponding to the profile specific network location of one of the plurality of participating web sites.

10. The system as defined in claim 1, wherein the plurality of participating web sites comprise a network communicatively connected through the Internet.

11. The system as defined in claim 1, wherein the information request originates from a personal computer communicatively connected to the plurality of independent participating web sites.

12. The system as defined in claim 1, wherein the plurality of client profiles comprise a plurality of encrypted client profiles.

13. The system as defined in claim 12, wherein the transaction server is configured to receive and process the plurality of encrypted client profiles.

14. The system as defined in claim 1, wherein transaction server further includes a display routine for displaying incentive information to a non-participating client in response to the request for content information from one of the participating distributed web sites.

15. The system as defined in claim 1, wherein the incentive award routine stores awarded incentive points for future redemption by the participating client as an accumulation of incentive points earned by different actions of the participating client.

16. The system as defined in claim 1, wherein the incentive award routine stores awarded incentive points for future redemption by the participating client as an accumulation of incentive points earned by actions of the participating client at different ones of the independent participating web sites.

17. A method of gathering information from a plurality of participating distributed web sites comprising:
    creating a client profile in a profile database to identify the preferences of a participating client;
    requesting at one of the plurality of participating distributed web sites, content information from a different one of the plurality of participating web sites;
    receiving the request for content information intended for the different one of the plurality of participating distributed web sites at a transaction server communicatively connected to the plurality of participating distributed web sites and the profile database, wherein the request for content information is initiated by the participating client at one of the plurality of participating distributed web sites, wherein the transaction server is independent of the different one of the plurality of participating web sites;

verifying that the request for content information was initiated by one of the participating clients;

determining client demographic information based on the request for content information initiated by the participating client at one of the participating distributed web sites and the client profile corresponding to the participating client;

awarding an incentive award to the participating client in response to the information request including storing the awarded incentive points for future redemption by the participating client, wherein the incentive award is awarded on a first visit to one of the plurality of participating web sites and a second incentive award is awarded for a subsequent visit if the subsequent visit occurs after a predetermined period of time; and sending a redirection message to the participating web site at which the participating client initiated the information request that redirects the participating client to the content information on the different one of the plurality of participating distributed web sites.

18. The method as defined in claim 17, further comprising transmitting a representation of the requested content information.

19. The method as defined in claim 18, wherein the representation comprises a web page address.

20. The method as defined in claim 17, wherein the representation comprises a web page.

21. The method as defined in claim 17, wherein receiving the request for content information comprises receiving a transport protocol message.

22. The method as defined in claim 21, wherein the requested content information comprises web page information.

23. The method as defined in claim 21, wherein the requested content comprises a web page address.

24. The method as defined in claim 17, wherein the client profile includes one or more of the group consisting of a network address, an identification number, and a user name.

25. The method as defined in claim 17, further comprising determining whether the participating client is associated with a predefined client profile type.

26. The method as defined in claim 17, further comprising transmitting an e-mail message to the participating client.

27. The method as defined in claim 26, wherein transmitting the e-mail messages comprises composing the e-mail message based on a predefined client profile associated with the participating client.

28. The method as defined in claim 27, wherein composing the e-mail message comprises selecting an e-mail message from a plurality of predefined e-mail messages.

29. The method as defined in claim 26, wherein transmitting an e-mail message comprises composing the e-mail message based on the request for content information.

30. The method as defined in claim 29, wherein composing the e-mail message comprises selecting an e-mail message from a plurality of e-mail messages.

31. The method as defined in claim 17, further comprising storing the client profile in a relational database.

32. The method as defined in claim 31, wherein the client profiles comprise demographic information associated with participating client.

33. The method as described in claim 31, further comprising requesting identification information.

34. The method as defined in claim 33, wherein requesting identification information comprises requesting encrypted identification information.

35. The method as defined in claim 33, wherein the identification information comprises one or more of the group consisting of a network address, an identification number, and a user name.

36. The method as defined in claim 17, wherein receiving the request for content information comprises receiving a network address.

37. The method as defined in claim 17, wherein receiving the request for content information comprises receiving web page information.

38. The method as defined in claim 17, wherein receiving the request for content information comprises receiving a transport protocol message.

39. The method as defined in claim 17, further comprising displaying incentive information to a non-participating client in response to the request for content information from one of the participating distributed web sites.

40. The method as described in claim 17, wherein storing awarded incentive points for future redemption by the participating client includes storing awarded incentive points as an accumulation of incentive points earned by different actions of the participating client.

41. The method as described in claim 17, wherein storing awarded incentive points for future redemption by the participating client includes storing awarded incentive points as an accumulation of incentive points earned by actions of the participating client at different ones of the independent participating web sites.

* * * * *